United States Patent Office.

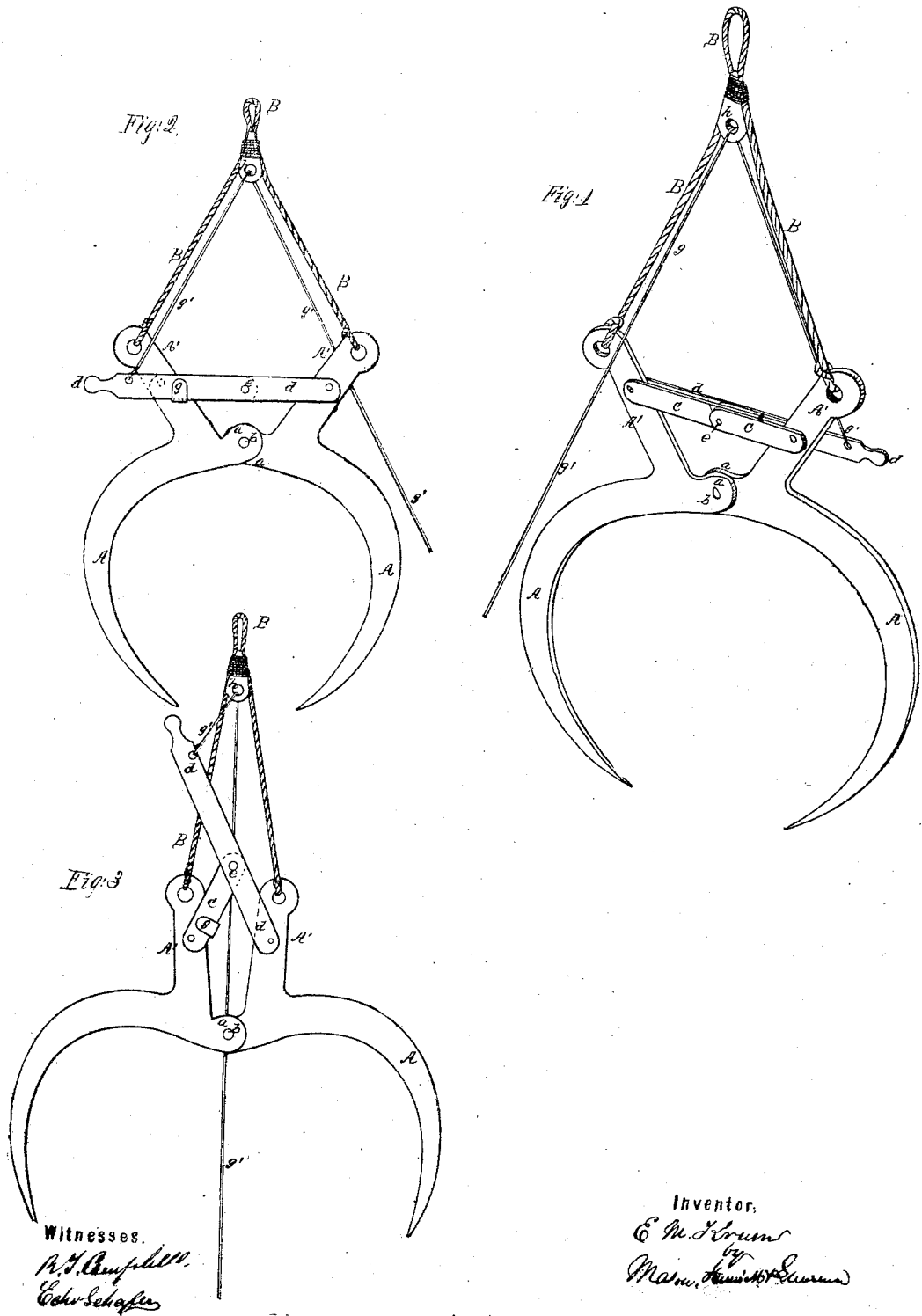

E. M. KRUM, OF NASSAU, NEW YORK.

Letters Patent No. 65,237, dated May 28, 1867.

---

IMPROVEMENT IN HORSE HAY-FORKS.

---

The Schedule referred to in these Letters Patent and making part of the same.

---

TO ALL WHOM IT MAY CONCERN:

Be it known that I, E. M. KRUM, of Nassau, in the county of Rensselaer, and State of New York, have invented a new and improved Hay-Elevating Fork; and I do hereby declare that the following is a full, clear, and exact description thereof, reference being had to the accompanying drawings, making a part of this specification, in which—

Figure 1 is a perspective view of my improved hay-fork, representing the parts in position for grasping and firmly holding a load of hay.

Figure 2 is a side view of the fork with the parts in the same position as indicated in fig. 1.

Figure 3 represents the fork in a condition for discharging its load.

Similar letters of reference indicate corresponding parts in the several figures.

This invention relates to a new and improved hay-fork of that class which is designed for elevating hay upon wagons and into barns. It consists in two curved tines which are pivoted together without crossing, and constructed with arms or handles, as will be hereinafter described, in combination with jointed locking-levers which are pivoted to the handles of the tines, and provided with a lever-handle, in such manner that when a bundle of hay is grasped by the tines and suspended by their handles, the jointed levers will securely lock and hold them in such condition until it is desired to release the bundle, which can be done by a slight movement of said lever-handle, as will be hereinafter described.

To enable others skilled in the art to understand my invention, I will describe its construction and operation.

In the accompanying drawings, A A represent two tines which are curved, as shown in figs. 2 and 3, for grasping a bundle of hay, and which are constructed with handles, A' A', upon their upper ends, and also with lugs or ears, $a\ a$, at the junction of the handles and tines. These tines are pivoted together by a pin, $b$, which passes through the two ears $a\ a$, and which allows the tines to work freely without rocking, as they would be liable to do if the tines were crossed like a pair of scissors. When the tines are locked in a position for grasping and holding a bundle of hay, as shown in figs. 1 and 2, their handles diverge from the fulcrum-pin $b$, so as to leave quite a wide space between their upper ends for receiving the toggle or locking-levers $c\ c$, and the long handle-lever $d$. The levers or arms $c\ c$ are of an equal length, and are pivoted together at their inner ends, and also pivoted to the tine-arms A' A' at their outer ends, as shown in the drawings. When the fork is suspended by the cord or chain, B, which is attached to the handles A', the point $e$ is in a vertical plane intersecting the axis or pivot $b$, as shown in figs. 2 and 3, and when the tines are locked about a bundle, as in figs. 1 and 2, said point $e$ falls below the pivots which connect the levers $e\ e$ to the arms A', consequently the weight upon the tines tends to move the point $e$ downward, which is resisted by the releasing-lever $d$ bearing down upon the hooked projection $g$. The lever $d$ is connected at one end to one of the arms $A^2$, by the same pivot which connects one of the levers $c$ to the same arm, and this lever is again pivoted by the pin $e$, so that it has the same movement as said levers $c$. The hooked stop $g$ is formed on the lever $c$, in such a position as to allow the point $e$ to drop slightly below the plane, intersecting the pivots at the outer extremities of the levers $c\ c$. A cord, $g'$, is attached to the free end of lever $d$, and carried upward and passed through an eye-block, $h$, which cord is used for tripping the fork and discharging the load therefrom, by raising the point $e$ and allowing the levers $c\ c$ to fold up, as shown in fig. 3. The handles A' not only serve as a means for connecting the jointed levers to the fork, but they also serve as handles by which a person can plunge the tines into a body of hay and then grasp a bundle. The handle or lever $d$ is also used, in loading the fork, for affording a leverage in the act of closing the tines about a bundle of hay and locking them in place, for by pressing upon the free end of this lever $d$ the points of the tines will be forcibly brought together.

Having described my invention, what I claim as new, and desire to secure by Letters Patent, is—

1. The construction of the curved tines A A, with angular portions A' A', and with jointing portions $a\ a$, said tines being connected together by means of a pivot, $b$, and toggle-links $c\ c\ c\ d$, the link $d$ being constructed and operating in the manner shown, all substantially in the manner and for the purpose set forth.

2. The arrangement of the cords B B B, and line $g'$, in combination with the pivoted tines A A', toggle-links $c\ c\ c$, and lever-link $d$, all in the manner and for the purpose described.

3. The arrangement of the stop $g$ on one of the toggle-levers, in combination with the lever-link $d$ of the toggle $c\ c\ c\ d$, substantially in the manner and for the purpose described.

E. M. KRUM.

Witnesses:
WM. G. HERMANCE,
E. S. STRAIT.